United States Patent
Landa et al.

(10) Patent No.: US 6,711,917 B2
(45) Date of Patent: Mar. 30, 2004

(54) PHOTOCHROMIC FLOAT GLASSES AND METHODS OF MAKING THE SAME

(75) Inventors: Ksenia A. Landa, Westmoreland, PA (US); Leonid M. Landa, Westmoreland, PA (US); Anthony V. Longobardo, Howell, MI (US); Scott Thomsen, Milford, MI (US)

(73) Assignee: Guardian Industries Corporation, Auburn Hills, MI (US)

( * ) Notice: Subject to any disclaimer, the term of this patent is extended or adjusted under 35 U.S.C. 154(b) by 0 days.

(21) Appl. No.: 09/946,836

(22) Filed: Sep. 6, 2001

(65) Prior Publication Data

US 2002/0059811 A1 May 23, 2002

Related U.S. Application Data

(60) Provisional application No. 60/232,833, filed on Sep. 15, 2000.

(51) Int. Cl.[7] .................... C03B 35/22; C03B 23/203
(52) U.S. Cl. .................. 65/32.2; 65/32.4; 65/45; 65/99.2
(58) Field of Search .................. 65/30.11, 45, 99.2, 65/32.2, 32.4, 53; 428/426, 427, 428, 212

(56) References Cited

U.S. PATENT DOCUMENTS

| | | | |
|---|---|---|---|
| 3,208,860 A | 9/1965 | Armistead et al. | 106/54 |
| 3,338,696 A | 8/1967 | Dockerty | 65/145 |
| 3,682,609 A | 8/1972 | Dockerty | 65/83 |
| 3,843,346 A | 10/1974 | Edge et al. | 65/65 A |
| 3,899,314 A * | 8/1975 | Siegmund | 156/99 |
| 4,148,661 A * | 4/1979 | Kerko et al. | 501/13 |
| 4,204,027 A | 5/1980 | Simon | 428/428 |
| 4,358,542 A | 11/1982 | Hares et al. | 501/13 |
| 4,390,635 A | 6/1983 | Morgan | 501/13 |
| 4,405,672 A | 9/1983 | Araujo et al. | 428/68 |
| 4,473,612 A | 9/1984 | Behr et al. | 428/213 |
| 4,786,305 A | 11/1988 | Ball et al. | 65/30.11 |
| 4,792,536 A | 12/1988 | Pecoraro et al. | 501/70 |
| 4,891,336 A | 1/1990 | Prassas | 501/13 |
| 5,214,008 A | 5/1993 | Beckwith et al. | 501/9 |
| 5,256,601 A | 10/1993 | Kerko et al. | 501/13 |
| 5,308,805 A | 5/1994 | Baker et al. | 501/71 |
| 5,482,902 A | 1/1996 | Claunch et al. | 501/13 |
| 5,731,091 A | 3/1998 | Schmidt et al. | 428/428 |
| 5,871,879 A | 2/1999 | Verlinden et al. | 430/155 |
| 6,092,392 A * | 7/2000 | Verlinden et al. | 65/148 |

* cited by examiner

*Primary Examiner*—Sean Vincent
(74) *Attorney, Agent, or Firm*—Nixon & Vanderhye PC

(57) ABSTRACT

Photochromic float glass and methods of making the same are provided. In especially preferred forms, the present invention is embodied in float glass having a non-photochromic glass substrate layer and a photochromic layer fused onto the substrate layer. During production, layers of the photochromic and non-photochromic glass are brought into contact with under conditions which fuse the layers one to another.

5 Claims, 3 Drawing Sheets

PHOTOCHROMIC FLOAT GLASSES AND METHODS OF MAKING THE SAME

Figure 1:
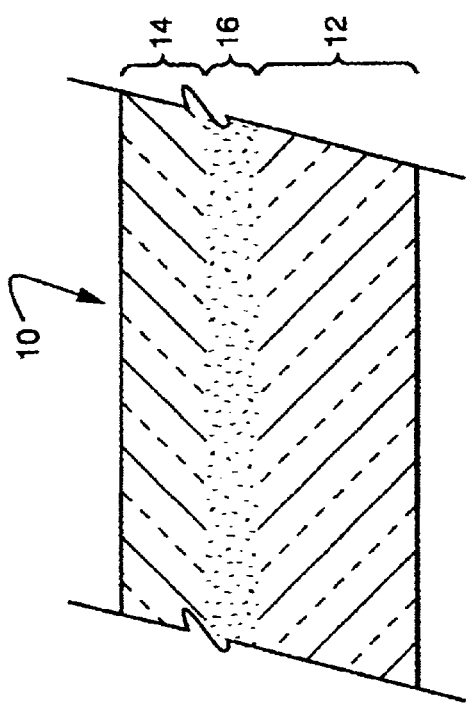

This application claims the benefit of Provisional Application No. 60/232,833, filed Sep. 15, 2000, the entire content of which is hereby incorporated by reference in this application.

FIELD OF THE INVENTION

The present invention relates generally to the field of photochromic glass and methods of making the same. More specifically, the present invention relates to photochromic glass. In especially preferred forms, the present invention is embodied in photochromic float glass (that is, glass made by a float process which exhibits photochromic properties).

BACKGROUND AND SUMMARY OF THE INVENTION

The formation of flat glass by the float method (i.e., so-called "float glass") is well known as evidenced, for example, by U.S. Pat. No. 3,843,346 to Edge et al (the entire content of which is expressly incorporated hereinto by reference). Generally, the float glass process includes floating a molten glass ribbon on a bath of molten metal (typically, molten tin or tin alloy). The float glass ribbon starts to cool and its thickness is established while on the molten metal bath. The ribbon is thereafter lifted off of the tin bath and conveyed into an annealing zone where it is controllably cooled to a temperature below its strain point. The annealed float glass sheet may then be subjected to further downstream cold and/or hot processes, such as, for example, cutting and final shaping.

Glass having photochromic properties is also well known as evidenced, for example, by U.S. Pat. No. 3,208,860 to Armistead et al (the entire content of which is expressly incorporated hereinto by reference). In essence, known photochromic glass are based principally on silver-halide inorganic glass chemistry which allows the glass to reversibly darken under exposure to actinic (ultraviolet) radiation. The increased darkness of the photochromic glass will then fade to the normal optical transmittance when exposure to the actinic radiation ceases.

Photochromisim in such glass is generally developed as a result of the formation of a micro-crystalline phase of silver halides in the glasses (typically after subjecting the glass to a thermal post-treatment). The formation of such microcrystalline phase of silver halides in the glass is only possible in glass matrices prone to liquation—notably, alkali-borosilicate glasses. Thus, photochromic glass most typically are formed of an alkali-alumino-borosilicate glass-forming system with silver chloride and bromide.

The conventional wisdom in the art is that the float process cannot be employed to produce glass with photochromic properties. Specifically, the environment of the float glass process (for example, the molten tin or tin alloy and/or atmosphere within the float glass furnace) is chemically hostile to many of the compositional constituents needed to impart active photochromism to the resulting glass product. Thus, for example, such constituents either in the glass melt, the furnace atmosphere and/or in the tin or tin alloy bath on which the melt is floated may conflict in terms of undesirable reduction/oxidation reactions, formation of clusters, volatility of one component in the presence of others, discoloration or extreme coloration and the like.

Large sheets of photochromic glass therefore, while capable of being produced using a drawn sheet glass process (see, for example, U.S. Pat. No. 4,358,542 to Hares et al, the entire content of which is incorporated expressly hereinto by reference), are traditionally thought to be incapable of being produced by a float process. It would therefore be highly desirable if float glass exhibiting active photochromic properties could be provided. It is towards fulfilling such a need that the present invention is directed.

Broadly, the present invention is embodied in photochromic float glass and methods of making the same. In especially preferred forms, the present invention is embodied in float glass having a non-photochromic glass substrate layer and a photochromic layer fused onto the substrate layer. During production, layers of the photochromic and non-photochromic glass are brought into contact with under conditions which fuse the layers one to another.

In one exemplary method for making the photochromic float glass of the present invention, a molten ribbon of non-photochromic glass is floated onto a molten metal (e.g., tin or tin alloy bath) within a float glass furnace. A second molten ribbon formed of a photochromic glass composition is then laid over the non-photochromic glass ribbon. The two glass ribbons thus fuse at their interface so as to achieve a unitary glass sheet comprised of a non-photochromic glass layer on the metal side of the sheet and a photochromic glass layer on the atmosphere side of the sheet. Alternatively, a molten ribbon of the photochromic glass may be brought into contact with a surface of a solid, but temperature-elevated, pre-made non-photochromic float glass layer so as to fuse the two layers one to the other.

The sheet of float glass can the be processed according to conventional practices such as annealing, heat treatment to develop and/or enhance/correct the photochromic properties of the glass, cutting, sizing and/or shaping.

As can be appreciated, the non-photochromic glass layer forms a barrier of sorts which protects the photochromic glass composition from the deleterious effects of the molten metal bath employed in conventional float glass processing. Moreover, according to the novel composition of the glass which ultimately forms the photochromic glass and/or the atmosphere within the float glass furnace are controlled so as to achieve the desired results. Notably, the photochromic glass composition employed in the present invention has a relatively high iron content (expressed as $Fe_2O_3$) which has traditionally been thought to impart a negative effect on the photochromic properties of a glass, decreasing its sensitivity to actinic radiation. Additionally (or alternatively), hydrogen is present in relatively small, but meaningful, amounts in the atmosphere of the float glass tin or tin alloy bath so as to minimize (if not eliminate entirely) undesirable surface reduction, and thus its attendant discoloration, of the photochromic glass composition exposed to such atmosphere.

These and other aspects and advantages will become more apparent after careful consideration is given to the following detailed description of the preferred exemplary embodiments thereof.

BRIEF DESCRIPTION OF THE ACCOMPANYING DRAWINGS

Figure 2:
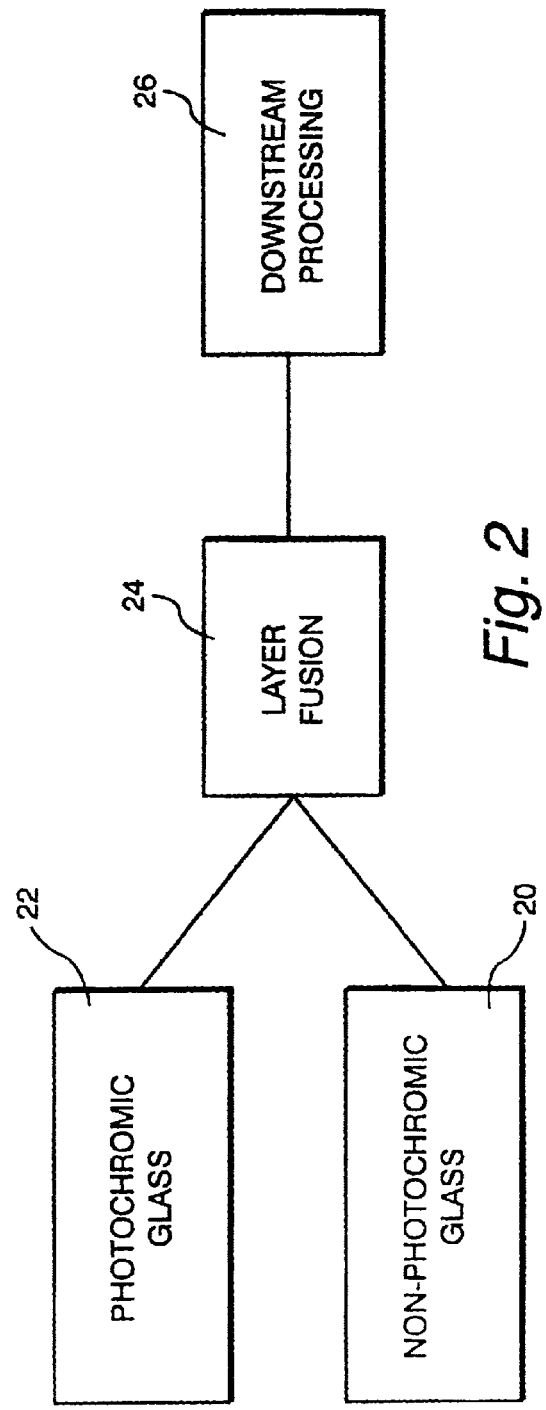
Figure 3:
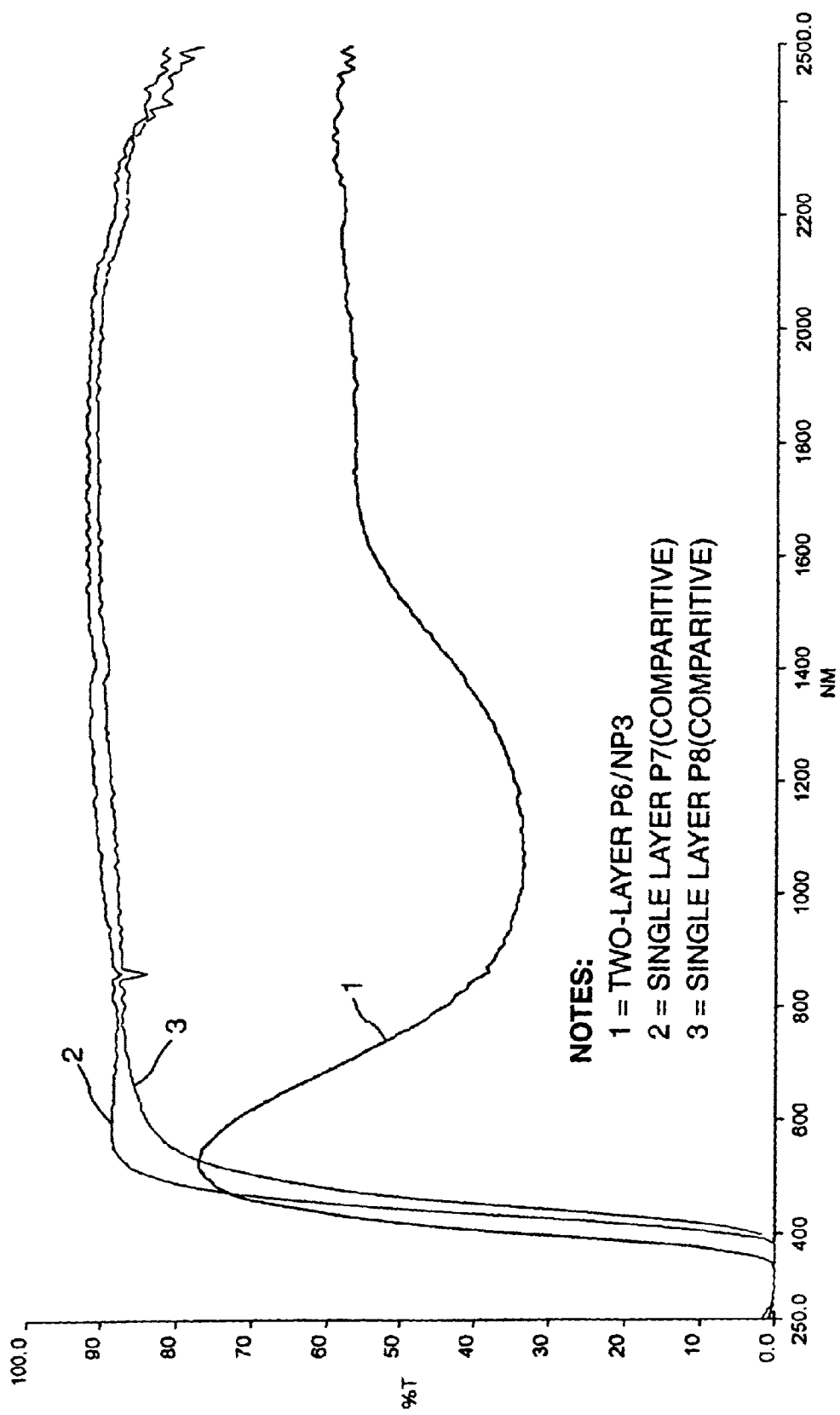
Figure 4:
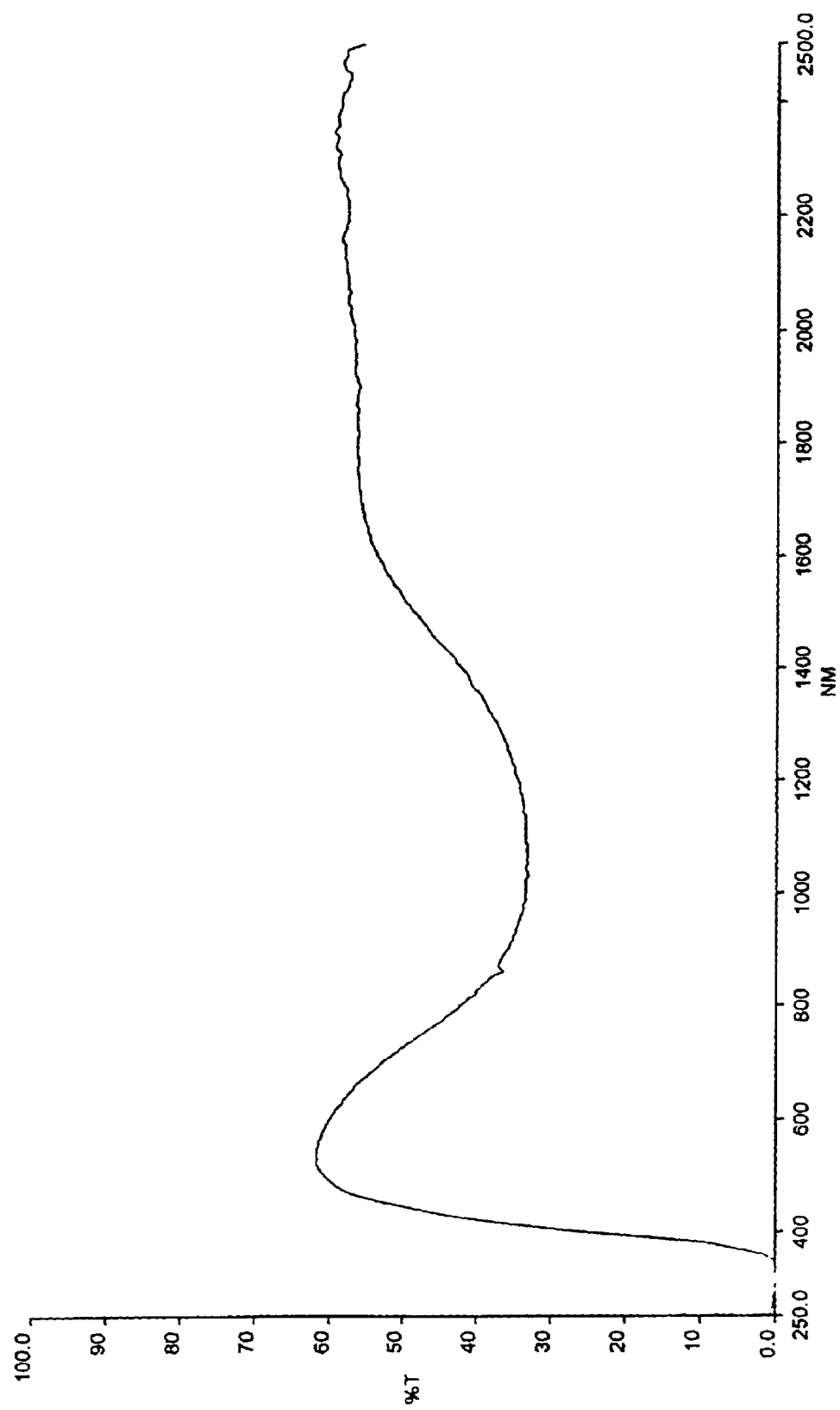

Reference will hereinafter be made to the accompanying drawings, wherein like reference numerals throughout the various FIGURES denote like structural elements, and wherein;

FIG. 1 is a greatly enlarged schematic cross-sectional view of an exemplary float glass sheet in accordance with the present invention; and FIG. 2 is a schematic diagram of one preferred float glass production technique to obtain the photochromic float glass of the present invention; and FIG. 3 shows, as curve number 1, a spectral trace of the double-layer glass of compositions P6 and NP3 below in an unexposed state and, for comparison purposes, spectral traces superposed thereon of single layer glass formed of compositions P7 and P8, respectively, superposed as curve numbers 2 and 3, respectively is shown in accompanying FIG. 4;

FIG. 4 is spectral trace of the double-layer glass formed of compositions P6 and NP3 in a darkened (exposed) state.

DETAILED DESCRIPTION OF THE INVENTION

I. Definitions

The following terms employed in the specification and claims are intended to have the following meanings:

"Photochromic", "photochromism" and like terms when used to describe a property of glass mean that the glass exhibits optical transmittance characteristics which reversibly vary in response to the intensity of actinic radiation incident thereon.

"Float glass" means substantially flat glass sheet in an as-produced form by a contiguous float process wherein one side of the glass sheet has been in physical contact with a molten metal (e.g., tin or tin alloy) and the opposite side of the glass sheet has been exposed to ambient atmospheric conditions. Flat sheets of float glass may thus be further processed by downstream operations, for example, so as to cut, shape (including bend), coat or otherwise fabricate the glass to suit particular end-use applications.

II. Description of Preferred Embodiments

A. General

Accompanying FIG. 1 depicts in greatly enlarged schematic fashion, a representative section of a sheet of photochromic float glass 10 in accordance with the present invention. In this regard, the glass sheet 10 according to the present invention includes a non-photochromic substrate glass layer 12 and a photochromic glass layer 14 which are fused one to another at an interfacial boundary layer 16. As was briefly noted above, the non-photochromic glass layer 12 provides a barrier of sorts which protects the photochromic glass layer 14 from chemical incompatibilities associated with the production process (e.g., the molten tin or tin alloy layer, float furnace atmosphere, and the like).

A schematic of a preferred method to produce the glass sheet 10 in accordance with the present invention is depicted generally in accompanying FIG. 2. As shown therein, the photochromic glass and non-photochromic glass are prepared separately using well known glass batching techniques. Specifically, the individual ingredients ultimately forming the non-photochromic glass and photochromic glass layers 12, 14 may be batch mixed separately in steps 20 and 22, respectively. These batch-mixed ingredients may then be heated to fuse the ingredients and thereby form the individual non-photochromic and photochromic layers 20, 22, respectively. The glass layers 20, 22 are brought into contact with one another in step 24 so as to fuse one to the other and thereby form the fused interfacial layer 16.

More specifically, molten ribbons of both the non-photochromic and photochromic glass formed in steps 20 and 22, respectively, may be brought together in step 24 by floating the molten non-photochromic glass on the surface of a tin or tin alloy bath within a float glass furnace and then laying a molten layer of the photochromic glass thereover. In this regard, the molten non-photochromic glass layer will most preferably be fed onto the tin or tin alloy bath at a temperature between about 800° C. to 1100° C.

The molten non-photochromic glass layer will cool somewhat to a temperature between about 500° C. to 600° C. at a low end of the temperature range and about 1000° C. at a high end of the temperature range as it moves downstream floating on the surface of the molten tin or tin alloy bath. At that time, the molten photochromic glass layer at a temperature between about 900° C. to about 1300° C. may be brought into fusion contact with the slightly cooled, but still molten non-photochromic glass layer.

Alternatively, the non-photochromic glass layer 12 may be pre-made using conventional single layer float glass production techniques. The resulting solidified non-photochromic glass substrate layer 12 may be subsequently heated in step 24 to a temperature between about 550° C. and 620° C. A molten ribbon of the photochromic glass layer 14 at a temperature between about 900° C. to 1300° C. may then be brought into contact with the heated non-photochromic glass layer 12 to allow the two layers to fuse one to another and thereby form a structurally unitary sheet 10 of photochromic glass.

Virtually any technique may be employed in the practice of the present invention so as to fuse the non-photochromic and photochromic glass layers 12, 14 one to another. For example, the glass of the present invention may be produced continuously by forming a vertical feed ribbon of photochromic glass as described, for example, in U.S. Pat. Nos. 3,338,696, 3,682,609 and 4,792,536 (the entire content of each being expressly incorporated hereinto by reference). The photochromic glass feed ribbon may then be delivered to a conventional ribbon of float glass such as produced by the technique described in the aforementioned U.S. Pat. No. 3,843,346. The photochromic glass layer and the non-photochromic glass layer may thus be fused one to another as has been described previously. Of course, as also noted above, batch or continuous techniques may be employed using previously formed non-photochromic float glass sheets onto which a molten ribbon of photochromic glass is deposited.

However those in this art may choose to bring the layers 12, 14 into contact with one another, the subsequently fused layers 12, 14 forming the sheet 10 may then be subjected to downstream processing in step 26. Specifically, the sheet 10 may be cut, shaped (including bent), coated and otherwise fabricated to suit particular end-use applications. The downstream processing in step 26 may also include heat treatments to anneal the sheet 10 and/or to impart photochromic properties thereto. In this regard, when molten ribbons of the non-photochromic and photochromic glass are fused together in a float glass furnace, the development of photochromism will occur simultaneously during such production by virtue of the photochromic layer residing on the hot surface of the non-photochromic layer floating on the molten tin or tin alloy bath for between 10 to about 20 minutes. Immediate development of photochromism is less likely when the melt layer of photochromic glass is brought into contact with the heated pre-made solid non-photochromic float glass layer. However, in such a situation, the resulting sheet of fused non-photochromic and photochromic glass layers may be subjected to heat treatment at temperatures between about 600 to about 700° C. for a period of time from about 30 minutes to about 2 hours in order for the photochromic layer 14 to develop its desired photochromism.

The thickness of the respective glass layers 12, 14 s not critical. For example, the non-photochromic glass substrate layer 12 as measured prior to fusion with the photochromic glass layer will most preferably be in the range of about 1 mm to about 10 mm, and preferably between about 2 mm to about 6 mm. On the other hand, the thickness of the photochromic glass layer, as measured prior to fusion with the non-photochromic glass layer, will most preferably be less than the thickness of the non-photochromic glass layer. For example, the photochromic glass layer 14 may have a thickness of between about 0.1 mm to about 1.0 mm, and more preferably between about 0.2 mm to about 0.5 mm.

The coefficient of thermal expansions ($\alpha$) of non-photochromic and photochromic glass layers 12, 14 are most preferably closely matched while yet having the coefficient of thermal expansion (P$\alpha$) of the photochromic glass layer 14 somewhat less than the coefficient of thermal expansion (NP$\alpha$) of non-photochromic glass layer 12. For example, when employing a soda-lime-silica float glass as layer 12, P$\alpha$ may be adjusted by increasing the $Na_2O$ and $Fe_2O_3$ content and decreasing the $B_2O_3$ content in the photochromic glass. Alternatively, the substrate glass layer 12 may be formed of a borosilicate substrate glass without substantially changing the composition of the photochromic glass.

B. Non-Photochromic Glass Layer Compositions

The non-photochromic float glass layer employed in accordance with the present invention can be formed of virtually any conventional float glass composition. Thus, for example, the float glass can be a soda-lime-silica glass composition. Glass formulations that may be employed include those described more fully in the above-cited U.S. Pat. No. 5,214,008 to Beckwith et al. Alternatively, the non-photochromic float glass layer may be a borosilicate glass composition.

Especially preferred soda-lime-silica and borosilicate float glass compositions are noted below as compositions (I) and (II) respectively, with the constituents being expressed in terms of the weight percent of oxide present:

|  | Composition | |
| --- | --- | --- |
| Constituent | (I) | (II) |
| $SiO_2$ | 68 to 75 | 65 to 68 |
| $B_2O_3$ | — | 10 to 19 |
| $Al_2O_3$ | 0 to 1 | 0 to 2 |
| $Na_2O$ | 10 to 18 | 9 to 14 |
| $K_2O$ | — | 0 to 1 |
| $Li_2O$ | — | 0 to 1.2 |
| MgO | 0 to 5 | — |
| CaO | 5 to 15 | 0 to 2 |
| $SO_3$ | 0.15 to 0.3 | 0.15 to 0.3 |

Iron, expressed as $Fe_2O_3$, is also present in the compositions (I) and/or (II) noted above in an amount between about 0.45 to about 1.2 wt. % (preferably between about 0.7 to about 0.95 wt. %) so as to impart solar management (especially infrared (IR) absorption) properties to the glass.

The non-photochromic float glass compositions employed in the present invention may also include other constituents and ingredients that may optionally be employed in conventional float glass formulations, for example, reducing agents, colorants and the like. For example, one (or more) reducing agent may be employed in an amount between about 0.1 wt. % to about 0.3 wt. % and can be selected from Si, SiO, carbon and sucrose. If employed, Si is most preferably present in an amount of from 0.05 to 0.15 wt. %; SiO is preferably present in an amount from 0.1 to 0.3; carbon is preferably present in an amount between 0.05 to 0.1 wt. % and sucrose is preferably present in an amount from 0.3 to 0.8 wt. %. Colorants may be employed for the purpose of privacy and/or tinting and may include one or more selected from Se (preferably 0.0004 to 0.0024 wt. %), CoO (preferably (0.0100 to 0.0300 wt. %), $Cr_2O_3$ (preferably 0.0100 to 0.0300 wt. %) and the like.

C. Photochromic Glass Layer Compositions

The photochromic glass that may be employed in the present invention are generally silver-containing alkali alumino-borosilicate compositions. Preferred photochromic glass compositions that may be employed in the practice of the present invention include between 60 to 68 wt. % $SiO_2$; between 12 to 25 wt. % $B_2O_3$; between 2 to 4 wt. % $Al_2O_3$; between 9 to 13 wt. % $Na_2O$; between 0 to 2 wt. % $K_2O$; between 0 to 2 wt. % $Li_2O$; between 0.03 to 0.6 wt. % iron expressed as $Fe_2O_3$; and between 0 to 0.3 wt. % $SO_3$.

Conventional colorants such as CoO, NiO and the like may be present in an amount between about 0 to about 0.1 wt. %. For example, if present, CoO is preferably included in the composition in amounts up to 0.03 wt. %, while NiO is may be included in amounts up to about 0.1 wt. %.

In addition to the base photochromic glass composition noted above, those elements responsible for its photochromic properties are present as follows: between about 0.16 to about 0.46 wt. % Ag; between about 0.02 wt. % to about 0.6 wt. % CuO; between about 0.3 to about 1.2 wt. % Cl; and between about 0.1 to about 0.5 wt. % Br.

Chlorine, along with silver, are indispensable elements. If the level of chlorine is too low, the glass will exhibit insufficient darkening, while if its content is too high, the sensitivity of the glass to incident actinic light decreases. Mixed silver halide (e.g., Ag(Cl,Br)) glasses demonstrate better spectral characteristics as compared to glasses doped with AgCl alone.

The CuO acts as a sensitizer of silver halides. The equilibrium $Cu^+ \leftrightarrows Cu^{2+}$ should be shifted toward $Cu^+$, which serves as an electron donor and therefore the presence of minimum quantities of $As_2O_3$ is required. In this regard, according to the present invention it has been found that silicon monoxide, SiO, not only is equivalent to $As_2O_3$ as a reducer, but also that SiO improves the sensibility and darkening characteristics of the photochromic glass. Thus, between about 0.01 to 0.1 wt. % SiO may be used alternatively, or additionally with up to 0.02 wt. % $As_2O_3$ in the photochromic compositions of the present invention.

The reversible darkening-fading photochromic reactions in glass when exposed to varying incident actinic radiation can be described as:

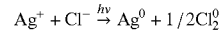
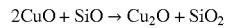
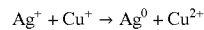

All reaction products are metastable and may revert to their original state.

The presence of $Al_2O_3$ improves chemical durability and stabilizes the glass matrix against deep phase separation.

Among alkalis, $Li_2O$ is believed to assist in obtaining the desired fading rate. However, the present of $Li_2O$ increases the devitrification tendency of the glass. Good photochromic parameters in glasses, which are either Li-free or contain only less than 2 wt. % $Li_2O$ have been obtained.

$K_2O$ is considered a component which enables dark glass to be obtained without affecting its fading rate (very high fading rate means too low darkening level), and is usually included in an amount o up to about 9 wt. %. In accordance with the present invention, sufficient darkening can be obtained using photochromic compositions which are potassium-free.

A variety of so-called "photochromic colorants" may be employed, such as Ag, Cl, Br, CuO and the like so as to impart to the glass a slightly yellow tint in the undarkened state. If necessary, the color or tint of the photochromic glass may be attenuated by the addition of conventional colorants, such as CoO and NiO, directly to the photochromic glass batch ingredients. The final color of the glass sheet in accordance with the present invention can be "engineered" by the color selection of the underlying non-photochromic float glass layer (i.e., since the final color of the glass sheet in accordance with the present invention will be a visual combination of the individual colors or tints of the photochromic and non-photochromic glass layers).

Iron, particularly $Fe_2O_3$, is not employed in conventional photochromic glass compositions due mainly to its possible interference with the sensitivity of the photochromic glass to incident actinic (UV) radiation. Indeed, the trivalent iron is a strong UV absorber which can be decreased in two ways (see, Weyl, Colored Glasses, p. 189 (1959)). First, the trivalent iron may be changed to a divalent state. The properties imparted to glass by FeO are highly desirable (e.g., high IR absorption). However, such a valency change requires the presence of a strong reducing agent in sufficient quantities, which will inevitably reduce silver ions with the resulting loss of photochromism. The second way to decrease UV absorption of $Fe_2O_3$ is to change the coordination of the $Fe^{3+}$ ions from 4 to 6 which can be accomplished by major changes in glass composition. Thus, it is believed that the presence of relatively large amounts of halides in the photochromic glass composition employed in the present invention favor the formation of sixfold coordination complexes of $Fe^{3+}$.

D. Glass Properties

Sheets of float glass exhibiting photochromic (and thus solar management) properties are obtained in accordance with the present invention. The sheets of photochromic float glass may thus be usefully employed in a variety of end-use applications, such as for architectural window glass, automotive glass (particularly sun-roof glass) and like applications.

The glass sheets of the present invention will typically exhibit the following properties:

(1) $T_0 > 40$ for tinted glass and $>70$ for clear glass;
(2) $T_{D15} < 25$ for tinted glass and $<40$ for clear glass;
(3) $T_{F5} < T_{D15} + 15\%$ for slow fading glass, and $<T_{D15} + 30\%$ for fast fading glass;
(4) %IR<30; and
(5) %UV (400)<20; where $T_0$ is the luminous transmission in the unexposed state;
$T_{D15}$ is the luminous transmission in the darkened stated after 15 minutes;
$T_{F5}$ is the fading rate at ambient temperature measured 5 minutes after being removed from incident actinic light;
%IR is the percent of infrared radiation transmittance; and
%UV (400) is the percent of ultraviolet radiation (400 nanometers) transmittance.

In order to obtain the characteristics noted above, the individual non-photochromic and photochromic glass layers should exhibit the following properties:

Non-Photochromic Glass Layer:
%Lta>70;
%IR<30; and
%UV<42.

Photochromic Glass Layer:
$T_0 > 50$ for tinted glass and $>80$ for clear glass;
$T_{D15} < 30$ for tinted glass and $<45$ for clear glass;
$T_{F5} < T_{D15} + 15\%$ for slow fading glass, and $<T_{D15} + 30\%$ for fast fading glass;
%IR<80; and
%UV (400)<20 (preferably <10).

E. EXAMPLES

The present invention will be further understood from the following non-limiting examples thereof.

Example 1

Batches of the photochromic glasses were prepared from raw materials, such as sand, boric acid, alkali carbonates or other materials which, when melted, are converted into their corresponding oxides. Silver was incorporated as silver nitrate, while chlorine and bromine were incorporated as their corresponding alkali metal chloride and bromide, respectively. Components used to tint glass were generally added as oxides. Since the losses of halogens and silver from the melt can be very high, for example, up to ~30% for Cl, ~40% for Br and 5–15% for Ag, they were introduced in excessive quantities to the raw material batch mix. Ingredients of the raw materials were weighed and thoroughly mixed to help in achieving homogeneity of the glass melt. The mix was then arc charged into an alumina crucible that was subsequently introduced into an electric furnace. The batch mix was melted at 1380–1450° C. for about 2–3 hours. After being cast into round graphite molds or into a square metal frame, the glass was annealed at about 500° C. The samples were further placed in an electric muffle furnace for a specific heat treatment protocol. In this regard, a temperature during heat treatment of between 600 and 640° C. for times between 0.5 to 2 hours was found to be satisfactory to obtain the desired optical properties. After heat treatment, the samples were ground and polished to a thickness of 4 or 2 mm for spectral measurement.

The color of the obtained glass was expressed as the trichromatic coordinates (x, y) defined by the C.I.E. colorimetric system. The color of the darkened state was determined after a 5–20 minutes exposure to a commercially available source of ultra-violet radiation (for example, Xe lamp). Spectral measurements were performed using Perkin Elmer spectrometer Lambda 19.

Table I below gives the batch ingredients (in weight percent), and properties of several photochromic glass compositions (identified as compositions P1 through P8) that may be used as specific examples of the photochromic glass layer according to the present invention. Table II gives the batch ingredients (in weight percent) used as specific examples of non-photochromic glass compositions (identified as compositions NP1 through NP3) that may be employed according to the present invention.

TABLE I

Batch Compositions (wt. % and Properties of Photochromic Glasses

|  | P1 | P2 | P3 | P4 | P5 | P6 | P7 | P8 |
|---|---|---|---|---|---|---|---|---|
| Base Glass | | | | | | | | |
| Sand | 62.8 | 62.8 | 62.8 | 62.8 | 62.8 | 62.8 | 62.8 | 62.8 |
| Soda Ash | 19.5 | 19.5 | 19.5 | 19.5 | 19.5 | 22.4 | 19.5 | 19.5 |
| Boric Acid | 34.16 | 34.16 | 34.16 | 34.16 | 34.16 | 34.16 | 34.16 | 34.16 |
| Al2O3 | 2.2 | 2.2 | 2.2 | 2.2 | 2.2 | 2.2 | 2.2 | 2.2 |
| K2CO3 | 3.8 | 3.8 | 3.8 | 3.8 | 3.8 | 3.8 | 3.8 | 3.8 |
| Li2CO3 | 3.2 | 3.2 | 3.2 | 3.2 | 3.2 | — | 3.2 | 3.2 |
| Dopants | | | | | | | | |
| AgNO3 | 0.60 | 0.48 | 0.60 | 0.55 | 0.80 | 0.60 | 0.60 | 0.60 |
| CuCO3 | 0.20 | 0.18 | 0.09 | 0.12 | 0.10 | 0.17 | 0.27 | 0.27 |
| KBr | 0.74 | 1.10 | 0.50 | 0.42 | 1.20 | 1.20 | 1.20 | 1.20 |
| NaCl | 0.95 | 1.40 | 0.80 | 1.10 | 2.10 | 1.90 | 1.90 | 1.90 |
| SiO | 0.08 | 0.10 | 0.10 | — | — | — | 0.10 | 0.10 |
| As2O3 | 0.06 | 0.10 | 0.17 | 0.12 | 0.12 | 0.10 | 0.10 | 0.12 |
| Fe2O3 | — | 0.60 | — | — | — | — | — | 0.60 |
| CeO2 | 0.10 | — | — | — | — | — | — | — |
| Heat Treatment: | | | | | | | | |
| Temp. (° C.) | 640 | 620 | 620 | 640 | 640 | 640 | 620 | 620 |
| Time (hrs) | 2 | 2 | 2 | 1 | 1.5 | 2 | 2 | 2 |
| Unexposed: | | | | | | | | |
| $T_0$ | 83 | 80.19 | 83.93 | 85.22 | 84.90 | 84.22 | 84.85 | 80.84 |
| Y | 81.16 | 79.30 | 82.20 | 85.24 | 84.13 | 83.06 | 83.81 | 78.87 |
| x | 0.3744 | 0.3602 | 0.3340 | 0.3293 | 0.3298 | 0.3420 | 0.3430 | 0.3616 |
| y | 0.4254 | 0.3898 | 0.3782 | 0.3621 | 0.3708 | 0.3692 | 0.3732 | 0.3943 |
| Exposed: | | | | | | | | |
| $T_{DS}$ | 67.1 | 52.32 | 43.21 | 54.04 | 59.14 | 58.12 | 44.19 | 50.34 |
| Y | 69.5 | 48.16 | 42.15 | 52.70 | 58.03 | 56.97 | 42.63 | 47.68 |
| x | 0.3847 | 0.3778 | 0.3588 | 0.3509 | 0.3552 | 0.3655 | 0.3628 | 0.3838 |
| y | 0.4251 | 0.3924 | 0.3725 | 0.3708 | 0.3463 | 0.3574 | 0.3793 | 0.3938 |

TABLE II

Batch Compositions (wt. %) and Properties of Substrate Float Glasses

|  | NP1 | NP2 | NP3 |
|---|---|---|---|
| Sand | 71.50 | 66.50 | 72 |
| Soda ash | 23.7 | 23.94 | 24 |
| Dolomite | 18.32 | — | 18.4 |
| Limestone | 6.1 | 2.68 | 6.2 |
| Salt cake | 0.5 | 0.5 | 0.7 |
| $Fe_2O_3$ | 0.6 | 0.8 | 0.69 |
| $Si_{met}$ | 0.1 | — | — |
| SiO | — | 0.3 | — |
| Carbon | — | — | 0.08 |
| $Cr_2O$ | — | — | 0.0022 |
| Thickness | 4.1 mm | 4.1 mm | 4.1 mm |
| % Lta | 76.09 | 70.40 | 74.94 |
| % UV | 45.03 | 28.90 | 42.23 |
| % TS | 50.53 | 44.81 | 49.26 |
| % IR | 28.75 | 23.56 | 27.52 |
| FeO | 0.1726 | 0.2062 | 0.1808 |
| Y | 77.61 | 70.82 | 76.31 |
| x | 0.3001 | 0.3077 | 0.3021 |
| y | 0.3203 | 0.3130 | 0.3231 |

Example 2

A glass sheet having a photochromic layer formed of composition P6 in Table I and a non-photochromic layer formed of composition NP3 in Table II was made and was subjected to spectral analyses. Accompanying FIG. 3 shows as curve number 1, a spectral trace of the double-layer glass of this Example 2 in an unexposed state. For comparison, spectral traces of single layer glass formed of compositions P7 and P8, respectively in Table I are superposed as curve numbers 2 and 3, respectively. A spectral trace of the double-layer glass formed of compositions P6 and NP3 in a darkened (exposed) state is shown in accompanying FIG. 4.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of making a photochromic glass comprising bringing a molten photochromatic glass layer formed of an iron and mixed silver halide-containing alkali aluminoborosilicate glass composition into contact with a molten non-photochromatic float glass layer at temperature and for a time sufficient to cause fusion to occur between said photochromatic glass layer and said non-photochromatic float glass layer at a surface boundary interface therebetween to thereby obtain a unitary glass structure exhibiting photochromic optical transmittance characteristics which reversibly vary in response to intensity of actinic radiation incident thereon.

2. The method of claim 1, practiced in an ambient atmosphere consisting essentially of hydrogen and nitrogen.

3. The method of claim 1, wherein a molten ribbon of said non-photochromatic float glass layer is floated on a surface of a molten tin or tin-alloy bath at a temperature between about 800° C. to 1100° C.

4. The method of claim 3, wherein said molten photochromic glass layer is brought into contact with said molten ribbon of said non-photochromic float glass layer while said photochromic float glass layer is floated on the surface of said molten tin or tin-alloy bath.

5. The method of claim 4, which comprises moving the molten ribbon of said non-photochromic float glass along the surface the molten tin or tin-alloy bath from one end thereof to another, and allowing the molten ribbon of said non-photochromic float glass layer to achieve a cooled temperature between about 500° C. to about 1000° C., and wherein said molten photochromic glass layer is brought into contact with said molten ribbon of said non-photochromic float glass while at said cooled temperature.

* * * * *